(12) United States Patent
Palmer et al.

(10) Patent No.: US 8,682,522 B2
(45) Date of Patent: Mar. 25, 2014

(54) SYSTEMS AND METHODS FOR TRIAGING A PLURALITY OF TARGETS WITH A ROBOTIC VEHICLE

(75) Inventors: Eric M. Palmer, Vail, AZ (US); James N. Head, Tucson, AZ (US); Robin Aileen Yingst, Sobieski, WI (US); Aladin A. Sayed, Tucson, AZ (US)

(73) Assignees: Raytheon Company, Waltham, MA (US); Planetary Science Institute, Tucson, AZ (US)

( * ) Notice: Subject to any disclaimer, the term of this patent is extended or adjusted under 35 U.S.C. 154(b) by 684 days.

(21) Appl. No.: 12/502,738

(22) Filed: Jul. 14, 2009

(65) Prior Publication Data

US 2011/0077800 A1      Mar. 31, 2011

(51) Int. Cl.
*G01C 22/00* (2006.01)
*G05D 1/00* (2006.01)

(52) U.S. Cl.
USPC .......... 701/28; 701/1; 701/2; 701/22; 701/23; 701/24; 701/25; 701/26; 701/27

(58) Field of Classification Search
None
See application file for complete search history.

(56) References Cited

U.S. PATENT DOCUMENTS

| | | | |
|---|---|---|---|
| 4,818,858 A * | 4/1989 | Sorimachi et al. | 250/203.2 |
| 5,109,425 A * | 4/1992 | Lawton | 382/107 |
| 5,257,209 A * | 10/1993 | Markandey | 701/1 |
| 5,400,244 A * | 3/1995 | Watanabe et al. | 701/28 |
| 5,602,978 A * | 2/1997 | Lastinger | 345/419 |
| 5,673,082 A * | 9/1997 | Wells et al. | 348/139 |
| 5,684,531 A * | 11/1997 | Li et al. | 348/139 |
| 5,897,156 A * | 4/1999 | Hayard et al. | 296/136.13 |
| 6,057,909 A * | 5/2000 | Yahav et al. | 356/5.04 |
| 6,275,773 B1 * | 8/2001 | Lemelson et al. | 701/301 |
| 6,438,456 B1 * | 8/2002 | Feddema et al. | 700/245 |
| 6,515,696 B1 * | 2/2003 | Steinhauer et al. | 348/211.99 |
| 6,583,815 B1 * | 6/2003 | Lomax et al. | 348/211.3 |
| 7,269,480 B2 * | 9/2007 | Hashimoto et al. | 700/259 |
| 7,410,266 B2 * | 8/2008 | Seo et al. | 359/851 |
| 7,434,355 B2 * | 10/2008 | Patel et al. | 52/2.11 |
| 7,982,777 B2 * | 7/2011 | Prechtl et al. | 348/211.11 |
| 2005/0134440 A1 * | 6/2005 | Breed | 340/435 |
| 2006/0229801 A1 * | 10/2006 | Fink et al. | 701/117 |
| 2007/0014347 A1 * | 1/2007 | Prechtl et al. | 375/240.01 |
| 2007/0188883 A1 * | 8/2007 | Seo et al. | 359/676 |

OTHER PUBLICATIONS

Terrance Fong et al., Human-Robot space site survey and sampling for space exploration, American institue of aeronautics and Astronautics, Space 200, Sep. 19-21, 2006 pp. 1-10.*

* cited by examiner

*Primary Examiner* — Bhavesh V Amin
(74) *Attorney, Agent, or Firm* — Daly, Crowley, Mofford & Durkee, LLP

(57) ABSTRACT

Methods and systems are provided for triaging a plurality of targets with robotic vehicle while the robotic vehicle remains at a first location. The robotic vehicle is in operable communication with a remote command station and includes a processor that is coupled to a first imager. The first imager generates separate images of each one of the plurality of targets while the robotic vehicle remains at the first location. The processor receives target data identifying the plurality of targets from the remote command station, acquires an image of each one of the plurality of targets with the first imager while the robotic vehicle remains at the first location, and transmits each generated image to the remote command station.

19 Claims, 4 Drawing Sheets

SYSTEMS AND METHODS FOR TRIAGING A PLURALITY OF TARGETS WITH A ROBOTIC VEHICLE

PRIORITY CLAIMS

This application claims the benefit of U.S. Provisional Application No. 61/089,854 filed Aug. 18, 2008.

TECHNICAL FIELD

The following discussion generally relates to control of a robotic vehicle, and more particularly related to systems and methods for triaging a plurality of targets with a robotic vehicle.

BACKGROUND

Increasingly, robotic vehicles are being utilized to explore and analyze remote, hazardous, and/or hostile environments. For example, robotic roving vehicles (RRVs) have been deployed to conduct exploratory and scientific missions on the surfaces of remote planets or other astronomical bodies. In some cases, these RRVs are configured to analyze geologic targets on the remote surface and to transmit the analysis data back to earth. To that end, some RRVs are equipped with robotic arms having various instruments for performing geochemical analysis and gathering other data regarding a geologic target. Such on-site geologic analysis provides valuable information regarding the composition, structure, physical properties, dynamics, and history of a remote terrain.

One technique for analyzing geologic targets includes a two-step triage or screening process. First, a geologist or other personnel reviews data describing the landscape surrounding the current location of the robotic vehicle in order to identify a plurality of geologic targets. Second, the robotic vehicle moves to the location of each identified geologic target and deploys a Microscopic Imager (MI) attached to its robotic arm to a very accurate position in order to acquire microscopic images of the geologic targets for petrographic analysis by a geologist or other personnel. Samples of the geologic target may then be analyzed based on the results of this petrographic analysis.

While the two-step triage process discussed above is effective, it does suffer from certain drawbacks. For example, the process requires the robotic vehicle to move to a new location and/or redeploy the robotic arm and MI for each selected geologic target. Further, the time required to position the MI and to acquire the image data often exceeds the time required to analyze a sample of a geologic target and, as a result, the image data for a geologic target is often received after the analysis data. Consequently, the two-step triage process described above can result in excessive movement of the robotic vehicle, increased wear and tear on the robotic arm, duplicative analysis, and other factors that may reduce the total number of diverse geologic samples that can be analyzed during the robotic vehicle's mission.

Accordingly, it is desirable to provide a system and a method for efficient triage of multiple geologic targets without having to move the robotic vehicle, deploy the robotic arm, or use other mission resources. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment a robotic system for triaging a plurality of targets while the robotic vehicle remains at a first location is provided. The robotic vehicle is in operable communication with a remote command station and includes a processor that is coupled to a first imager. The first imager generates separate images of each one of the plurality of targets while the robotic vehicle remains at the first location. The processor receives target data identifying the plurality of targets from the remote command station, acquires an image of each one of the plurality of targets with the first imager while the robotic vehicle remains at the first location, and transmits each generated image to the remote command station.

In another embodiment, a method for triaging a plurality of geologic targets disposed on a landscape that surrounds the current location of a robotic vehicle is provided. The robotic vehicle is in operable communication with a remote command center and includes a first imager for generating separate high-resolution images of each one of the plurality of geologic targets while the robotic vehicle remains at its current location. The method comprises receiving target data from the remote command device at the robotic vehicle, the target data identifying the plurality of geologic targets, generating at least one high-resolution image of each one of the plurality of geologic targets with the first imager, and transmitting each generated high-resolution image from the robotic vehicle to the remote command device.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In addition, it should be noted that FIGS. 1-4 are merely illustrative and may not be drawn to scale. Finally, embodiments are described herein in terms of functional block components and processing steps. Such functional blocks may be realized by any number of components configured to perform the specified function and achieve the various results.

Figure 1:
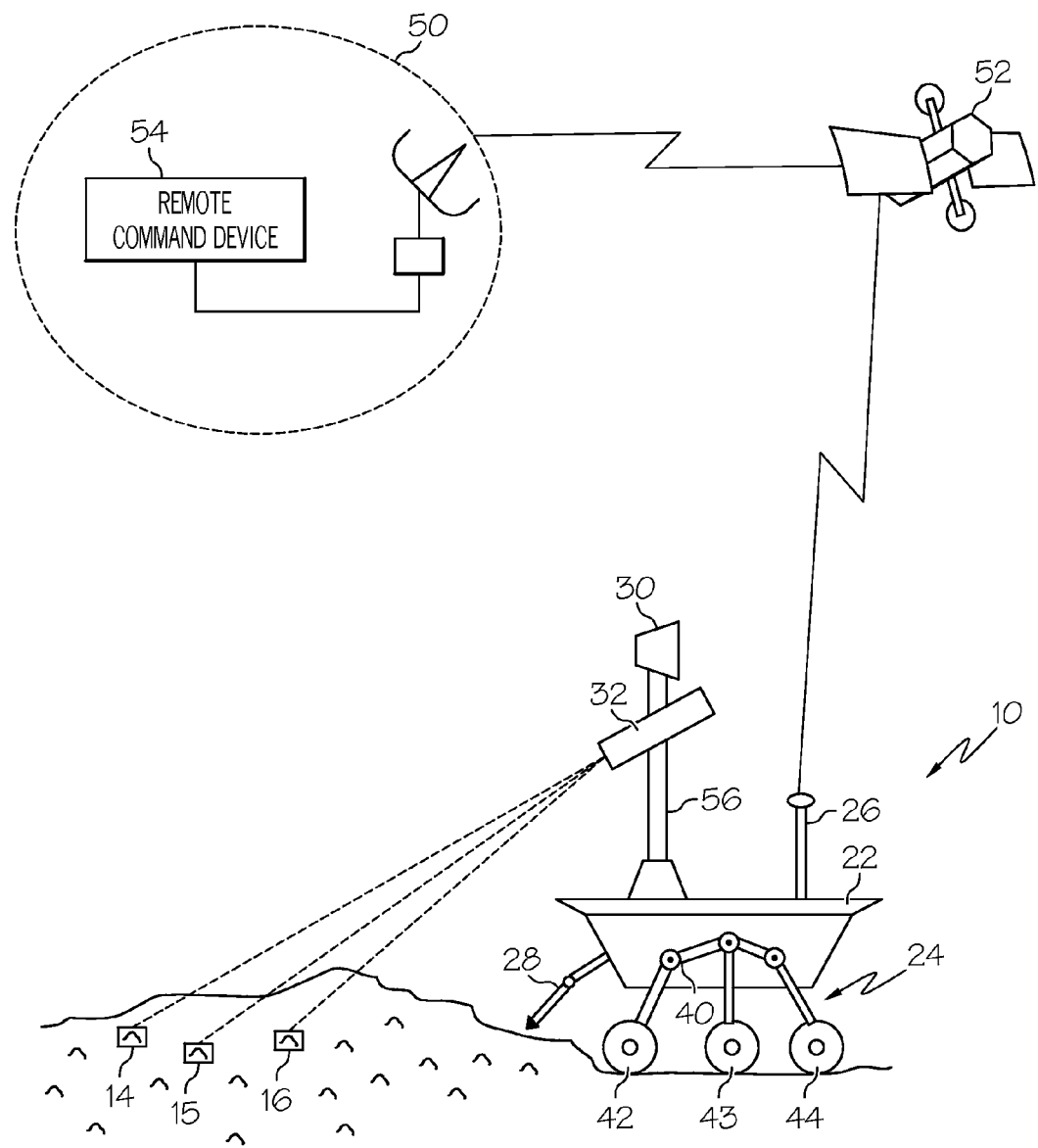
FIG. 1 depicts an exemplary robotic vehicle according to one embodiment.

FIG. 1 illustrates an exemplary robotic vehicle 10 according to one embodiment. As depicted, robotic vehicle 10 comprises a land-based vehicle that is configured to maneuver over the surface of a planet or other astronomical body. In one embodiment, robotic vehicle 10 comprises a robotic roving vehicle (RRV) for conducting exploratory missions of remote planetary surfaces, such as one of the Mars exploratory rovers (MERs). As further discussed below, robotic vehicle 10 is configured to generate high-resolution images of geologic targets (e.g., geologic targets 14, 15, and 16) without moving from its current location. These high-resolution images may be utilized for triage of the geologic targets to assess whether additional analysis is merited. Although embodiments are described herein with regard to a robotic vehicle 10 for triaging geologic targets, it will be appreciated that alternative embodiments may be utilized for triage of other target types. For example, alternative embodiments may be utilized for triage of objects in hostile or hazardous environments, such as Improvised Explosive Device (IED) examinations, nuclear or chemical reactors, high-voltage facilities, wildlife habitats, the undersides of bridges, and dynamic manufacturing processes.

Robotic vehicle 10 includes a power source 22, a drive system 24, an antenna 26, a robotic arm 28, a panoramic imager 30, and a high-resolution imager 32. Power source 22 supplies electrical power to various processors, controllers, actuators, sensors imagers, and other components of robotic vehicle 10. In the depicted embodiment, power source 22 includes a solar array that converts solar radiation into electrical power. Power source 22 may also include one or more batteries, generators, and other devices for generating electrical power.

Drive system 24 is operable to move robotic vehicle 10 over the surrounding landscape. As depicted, driver system 24 includes a suspension system 40 and a plurality of rotatable wheels 42, 43, 44. Drive system 24 further includes one or more non-illustrated actuators configured to rotate and/or turn wheels 42-44 in response to received command signals. It will be appreciated that drive system 24 is merely an exemplary drive system according to one embodiment and that alternative embodiments may utilize other drive mechanisms, such as one or more tread belts.

Antenna 26 communicates with a remote command station 50 via one or more wireless communication networks. Antenna 26 may utilize any suitable wireless communication technique to communicate with remote command station 50, including satellite communications, microwave radio communications, and other suitable communication techniques. In one embodiment, antenna 26 is configured to communicate with remote command station 50 via the Deep Space Network (DSN) and/or one or more satellites 52. Remote command station 50 may include one or more electronic devices (remote command devices) 54 for communicating with robotic vehicle 10.

Robotic arm 28 may be deployed to prepare and/or analyze samples of a geologic target. In its deployed position, arm 28 extends outwardly from robotic vehicle 10 to the position of the geologic target. Arm 28 may then utilize a plurality of instruments to prepare (e.g., crush, grind, drill, scrape, etc.) and/or analyze a sample of the geologic target. In one embodiment, arm 28 includes one or more sample preparation instruments (e.g., rock abrasion tools, drills, etc.) and one or more sample analysis instruments (e.g., spectrometers, magnets, etc.). In addition, arm 28 may include one or more sample collection devices (e.g., a scoop, a bucket, etc.) for collecting a sample of the geologic target and transporting the sample inside of robotic vehicle 10 for additional analysis.

Panoramic imager 30 captures images of the landscape, or a portion of the landscape, surrounding the current location of robotic vehicle 10. The images generated by panoramic imager 30 include a plurality of geologic targets 14-16 that may be selected for additional imaging by high-resolution imager 32 as further discussed below. In the depicted embodiment, panoramic imager 30 is coupled to a camera mast 56 that extends upwardly from robotic vehicle 10. Panoramic imager 30 and/or camera mast 56 may be configured to rotate enabling panoramic imager 30 to create panoramic images of the surrounding landscape. In one exemplary embodiment, panoramic imager 30 includes a stereo camera that generates stereoscopic images of at least a portion of the surrounding landscape, enabling the depth or distance between panoramic imager 30 and each geologic target 14-16 to be determined using a range imaging technique.

High-resolution imager 32 performs detailed imaging of geologic targets 14-16 within a predetermined range without the need to physically relocate robotic vehicle 10. High-resolution imager 32 may utilize one or more telescopic, telephoto, tele macro, and/or zoom architectures and a focus mechanism to generate the high-resolution images. As further described below, in one embodiment the images generated by high-resolution imager 32 are used for triage of geologic targets. In this case, the high-resolution imager 32 is operable to generate images of targets with sufficient resolution to show various geologic characteristics, including textures, layers, grain structures, mineral content, and/or other geologic characteristics. Further, in some embodiments the field of view of the images generated by high-resolution imager 32 substantially corresponds to the dimensions of the imaged geologic target. In one exemplary embodiment, high-resolution imager 32 is operable to generate 0.04-0.2 mm/pixel images of geologic targets within a range of 1-10 meters.

As depicted, high-resolution imager 32 is coupled to camera mast 56 below panoramic imager 30. However, high-resolution imager 32 may be alternatively coupled to other positions on camera mast 56 or robotic vehicle 10. In addition, high-resolution imager 32 may be bore-sighted with, or configured to move (e.g., tilt and rotate) independently of, panoramic imager 30.

Figure 2:
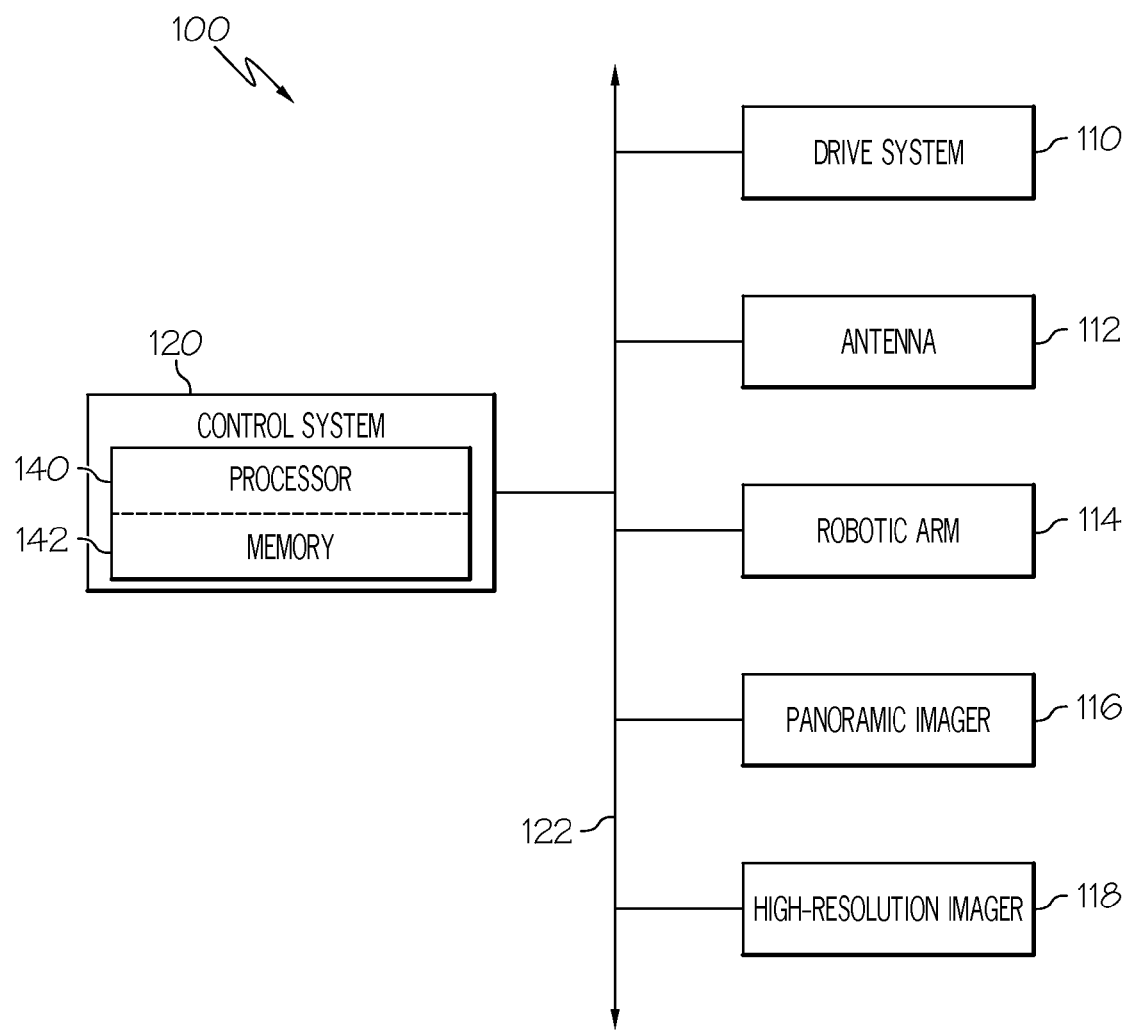
FIG. 2 is a block diagram of an exemplary control system for a robotic vehicle according to one embodiment.

FIG. 2 is a block diagram of an exemplary robotic vehicle 100. As depicted, robotic vehicle 100 includes a drive system 110, an antenna 112, a robotic arm 114, a panoramic imager 116, and a high-resolution imager 118. Each of these components is operable to perform substantially the same functions as the corresponding component of robotic vehicle 10 described above with respect to FIG. 1. In addition, each of these components is coupled to a control system 120 via a data communication link 122. In one embodiment, data communication link 122 comprises an onboard data communication bus that transmits data, status, command, and other information or signals between various components of robotic vehicle 100. Finally, the depicted components may each receive electrical power from a power source (e.g., power source 22 of FIG. 1) via a non-illustrated power supply bus.

Control system 120 includes a processor 140 and memory 142. Processor 140 may comprise any type of processor or multiple processors, single integrated circuits such as a microprocessor, or any suitable number of integrated circuit devices and/or circuit boards working in cooperation to accomplish the functions of a processing unit. Processor 140 is operable to selectively transmit data and commands to, and to selectively receive data from, drive system 110, antenna 112, robotic arm 114, panoramic imager 116, and high-resolution imager 118. During operation, processor 140 executes one or more instructions, preferably stored within memory 142, to perform or execute various processes and methods including the methods for efficient triage of geologic targets described below.

Memory 142 may be any type of suitable memory, including various types of dynamic random access memory (DRAM) such as SDRAM, various types of static RAM (SRAM), and various types of non-volatile memory (PROM, EPROM, and flash). It should be understood that the memory 142 may be a single type of memory component, or it may be composed of many different types of memory components.

As noted above, memory 142 stores instructions for executing one or more methods, including the methods for efficient triage of geologic targets described below. In addition, memory 142 may also store various other data.

Figure 3:
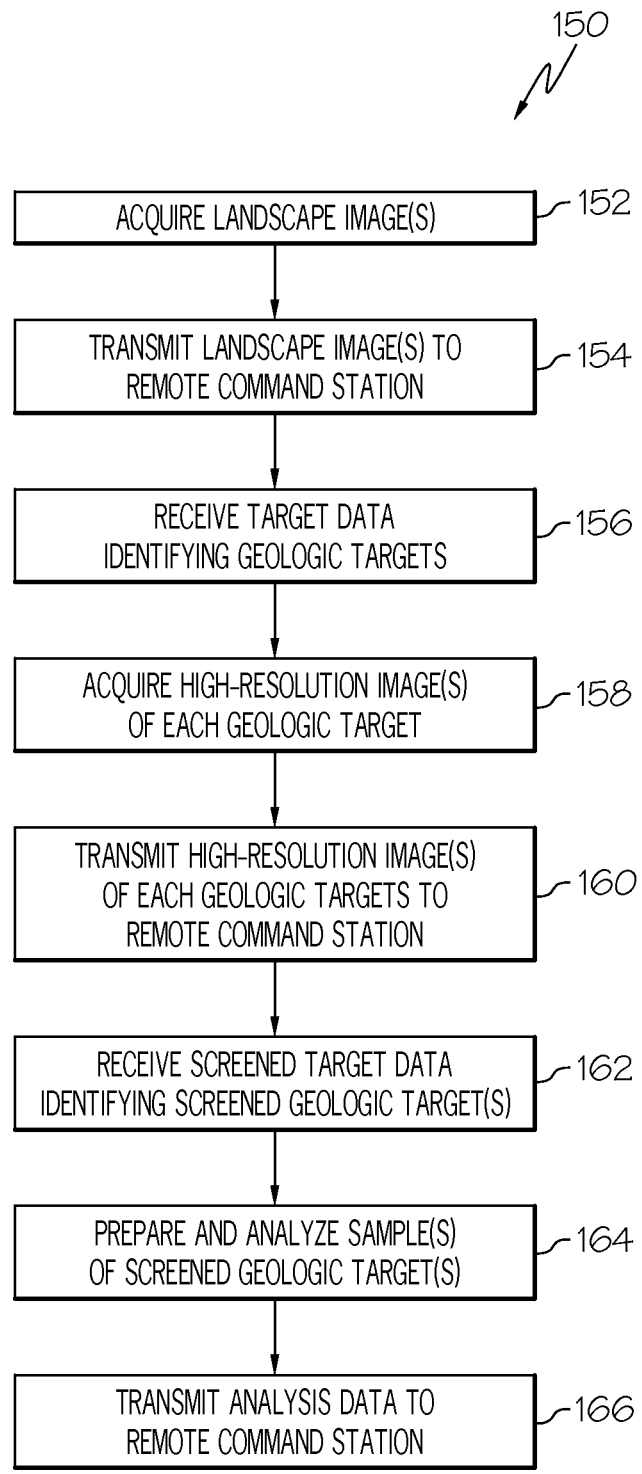
FIG. 3 is a flowchart of an exemplary method for efficient triage of geologic targets with a robotic vehicle.

FIG. 3 is a flowchart of an exemplary method 150 for efficient triage of geologic targets with a robotic vehicle. In one embodiment, the steps of method 150 are performed or executed by a processor (e.g., processor 140 of FIG. 2) or other processing unit within the robotic vehicle. However, it will be appreciated that the steps described below may also be performed or executed using various other hardware, software, and/or firmware components.

During step 152 of method 150, one or more images of a landscape at or near the current location of the robotic vehicle are acquired. With reference to FIGS. 2 and 3, in one embodiment processor 140 executes step 152 by selectively issuing command signals to panoramic imager 116 to generate one or more panoramic images of the surrounding landscape. In response, panoramic imager 116 generates the panoramic image(s) and transmits the panoramic image data to processor 140. It will be appreciated that the images acquired during step 152 may also be generated remotely, by a satellite or another vehicle, and delivered to processor 140 (or directly to a remote command station) through any suitable mechanism.

Next, during step 154 the panoramic image data is transmitted to a remote command station (e.g., remote command station 50 of FIG. 1). The panoramic image data may be transmitted using any suitable technique or mechanism. For example, processor 140 executes step 154 by transmitting the panoramic image data to the remote command station via antenna 112. In one embodiment, processor 140 transmits the panoramic image data automatically upon receipt of the data. Alternatively, processor 140 may store the panoramic image data in memory 142 for subsequent transmission (e.g., during a predetermined data transmission window or upon receipt of a request from the remote command station).

Each panoramic image received at the remote command station is analyzed to identify geologic targets (e.g., geologic targets 14-16 of FIG. 1) of interest within the depicted landscape. The geologic targets may be identified using any suitable technique. For example, the geologic targets may be identified manually by one or more geologists or other personnel that analyze the panoramic image(s). Alternatively, the geologic targets may be identified automatically by a predetermined target identification algorithm. Regardless of the technique used to identify the geologic targets, the remote command station transmits target data that identifies the geologic targets and is received by the robotic vehicle during step 156.

Next, high-resolution images of each geologic target are acquired (step 158). Processor 140 executes step 158 by selectively issuing command signals to high-resolution imager 118 to generate the appropriate high-resolution images. In response to these command signals, high-resolution imager 118 generates one or more high-resolution images of each geologic target and transmits the high-resolution image data to processor 140. In one embodiment, each geologic target is positioned within the portion of the surrounding landscape that corresponds to the predetermined range of high-resolution imager 118 (e.g., 1-10 meters). In this case, high-resolution imager 118 is able to generate high-resolution image(s) of each geologic target without the need to reposition robotic vehicle 100.

The high-resolution image data is transmitted to the remote command station during step 160. The high-resolution image data may be transmitted using any suitable technique of mechanism. In one embodiment, processor 140 executes step 160 by transmitting the high-resolution image data to the remote command station via antenna 112. Processor 140 may transmit the high-resolution data automatically upon receipt of the data. Alternatively, processor 140 may store the high-resolution image data in memory 142 for subsequent transmission (e.g., during a predetermined data transmission window or upon receipt of a request from the remote command station).

The high-resolution images received at the remote command station are used to triage the geologic targets. In this case, high-resolution imager 118 is operable to generate images having sufficient resolution to enable geologic characteristics (e.g., textures, layers, grain structure, mineral content, etc.) of the imaged targets to be identified. In one embodiment, each high-resolution image is presented to one or more geologists or other personnel for petrographic analysis. The geologists or other personnel may then select at least one geologic target (hereinafter, the "screened geologic target(s)") from the plurality of geologic targets for additional analysis. Alternatively, the screened geologic target(s) may be selected automatically by a predetermined target selection algorithm. Regardless of the technique used to select the screened geologic target(s), the remote command station transmits screened target data that identifies the screened geologic target(s) and is received by the robotic vehicle during step 162.

During step 164, the robotic vehicle analyzes one or more samples from the screened geologic target(s). This includes, for each screened geologic target, relocating robotic vehicle 100 to the location of the screened geologic target and analyzing a sample of the screened geologic target using the sample analysis instruments of robotic arm 114. The analysis data for the screened geologic target(s) is then transmitted to the remote command station during step 166. Processor 140 executes step 158 by transmitting the analysis data to the remote command station via antenna 112. Processor 140 may transmit the analysis data automatically upon receipt thereof or processor 140 may store the analysis data in memory 142 for subsequent transmission (e.g., during a predetermined data transmission window or upon receipt of a request from the remote command station).

It should be noted that although method 150 is described herein with regard to the triage of geologic targets, alternative embodiments may utilize substantially similar methods and processes to triage other targets with a robotic vehicle. For example, embodiments may be utilized for triage of targets in hostile or hazardous environments, including triage of IEDs, nuclear or chemical reactors, high-voltage facilities, wildlife habitats, the underside of bridges, and dynamic manufacturing processes, to name a few.

Figure 4:
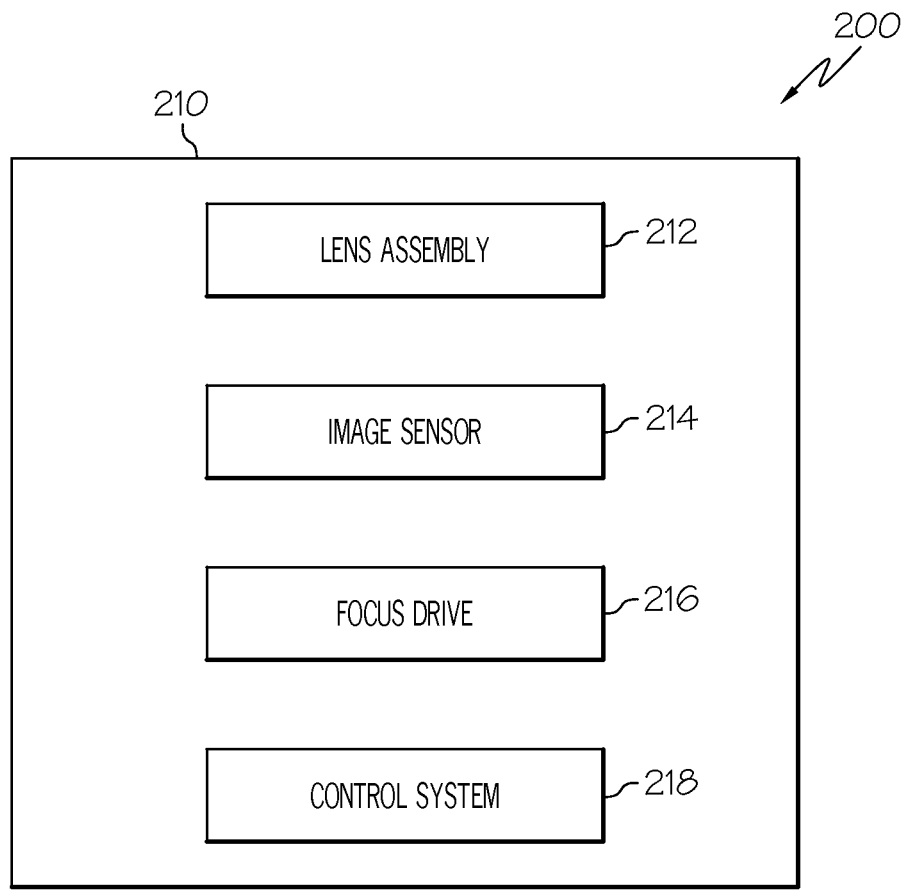
FIG. 4 is a block diagram of a high-resolution imager according to one embodiment.

FIG. 4 is a block diagram of a high-resolution imager 200 according to one embodiment. As noted above, high-resolution imager 200 may utilize various telescopic, telephoto, tele macro, and/or zoom architectures and one or more focus mechanism to generate high-resolution images of targets (e.g., geologic targets) within a predetermined range. The high-resolution images may be microscopic scale images. In one exemplary embodiment, high-resolution imager 200 is operable to generate 0.04-0.2 mm/pixel images of targets from 1-10 meters away. In the depicted embodiment, high-resolution imager 200 includes housing 210, a lens assembly 212, a image sensor 214, focus drive 216, and a control system 218. Housing 210 provides support and alignment for the various components of high-resolution imager 200. In one embodiment, housing 210 is constructed of a durable lightweight material, such as beryllium, titanium, aluminum, or a composite material.

Lens assembly 212 includes an aperture and one or more lens groups for generating high-resolution images that are captured by image sensor 214. In one exemplary embodiment, lens assembly 212 has a 20-30 mm aperture and a 100-200 nm focal length. In general, the aperture diameter (D) for lens assembly 212 may be determined based on the Airy disc diameter equation having the form:

$$d = 2.44(\lambda)(f)/D \qquad (\text{Eq. 1})$$

where:
- d is the desired pixel diameter (or Airy disc diameter);
- λ is the wavelength of visible light (e.g., 450-850 nm); and
- f is the focal length.

Accordingly, for longer focal lengths (f) and/or smaller pixel diameters (d), lens assembly 212 may require a larger aperture diameter.

Each lens group includes one or more optical elements (e.g., optical lenses or optical filters) that are inserted into the optical path between the aperture and image sensor 214 (hereinafter, the "optical path"). In one embodiment, lens assembly 212 includes one or more telescopic lens groups telephoto lens groups, tele macro lens groups, and/or zoom lens groups. Further, these lens groups may be selectively inserted within the optical path to achieve a desired image scale and/or resolution. For example, the optical telescopes and lens groups may be arranged on one or more lens wheels that are configured to selectively insert the appropriate lens groups into the optical path. It will be appreciated that alternative embodiment may utilize other techniques for selectively inserting and removing one or more lens groups into the optical path.

Image sensor 214 captures the high-resolution image generated by lens assembly 212. Image sensor 214 may include one or more charged coupled devices (CCDs) or other suitable image sensing devices. Focus drive 216 may utilize any suitable technique to focus high-resolution imager 200, including adjusting the position of image sensor 214 and/or the positions of one or more of the lens groups within lens assembly 212. Further, control system 218 is operable to control focus drive 216, lens assembly 212, and/or the other components of high-resolution imager 200. Control system 218 may be selectively control these components based on one or more command signals received from a processing unit (e.g., processor 140 of FIG. 2).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A robotic vehicle for triaging a plurality of targets while positioned at a first location, the robotic vehicle in operable communication with a remote command station and comprising:
   a first imager for generating separate images of each one of the plurality of targets while the robotic vehicle remains at the first location; and
   a processor coupled to the first imager and configured to:
   receive target data from the remote command station, the target data identifying the plurality of targets to be imaged by the first imager;
   acquire an image of each one of the plurality of targets from the first imager while the robotic vehicle remains at the first location, wherein the separate images of the plurality of targets comprise high-resolution microscopic scale images of about 0.04 to about 0.2 mm/pixels from a distance ranging from about 1 to 10 meters;
   transmit each generated image to the remote command station;
   receive screened target data from the remote command station identifying at least one screened target selected from the plurality of targets;
   relocate the robotic vehicle to the position of the at least one screened target;
   obtain a sample of the at least one screened target;
   analyze the sample of the at least one screened target; and
   transmit results of the analyzed sample to the remote command station.

2. The robotic vehicle of claim 1, wherein the first imager is configured to generate separate high-resolution images of each one of the plurality of targets while the robotic vehicle remains at the first location.

3. The robotic vehicle of claim 2, wherein the field of view of each high-resolution image substantially corresponds to the dimensions of the corresponding one of the plurality of targets.

4. The robotic vehicle of claim 1, further comprising a second imager coupled to the processor and operable to generate panoramic images of at least a portion of the landscape surrounding the robotic vehicle, wherein the processor is further configured to:
   acquire a panoramic image of at least a portion of the landscape surrounding the robotic vehicle while the robotic vehicle is positioned at the first location, the panoramic image comprising the plurality of targets; and
   transmit the panoramic image to the remote command station before receiving the target data.

5. The robotic vehicle of claim 4, further comprising a camera mast and wherein the first imager and the second imager are coupled to the camera mast.

6. The robotic vehicle of claim 5, wherein the first imager is bore-sighted with the second imager.

7. The robotic vehicle of claim 1, wherein the robotic vehicle is configured for performing exploratory missions of remote planetary surfaces.

8. The robotic vehicle of claim 7, wherein the first imager further comprises a lens assembly, a focus drive, and an image sensor.

9. The robotic vehicle of claim 8, wherein the first imager further comprises at least one telescopic lens assembly.

10. The robotic vehicle of claim 8, wherein the first imager further comprises at least one telephoto lens group.

11. The robotic vehicle of claim 6, wherein:
   the plurality of targets further comprises a plurality of geologic targets positioned on a first portion of the landscape surrounding the first location; and
   the first imager is further configured to generate images with sufficient resolution to show geologic characteristics of the plurality of geologic targets.

12. A method for triaging a plurality of geologic targets disposed on a landscape that surrounds the current location of a robotic vehicle, wherein the robotic vehicle is in operable communication with a remote command device and comprises a first imager for generating separate high-resolution images of each one of the plurality of geologic targets while the robotic vehicle remains at its current location, the method comprising:
- receiving target data from the remote command device at the robotic vehicle, the target data identifying the plurality of geologic targets to be imaged by the first imager;
- acquiring a separate high-resolution image of each one of the plurality of geologic targets from the first imager while the robotic vehicle remains at its current position, wherein the separate images of the plurality of targets comprise high-resolution microscopic scale images of about 0.04 to about 0.2 mm/pixels from a distance ranging from about 1 to 10 meters;
- transmitting each generated high-resolution image from the robotic vehicle to the remote command device;
- receiving screened target data from the remote command station identifying at least one screened target selected from the plurality of targets;
- relocating the robotic vehicle to the position of the at least one screened target;
- obtaining a sample of the at least one screened target using a robotic arm of the robotic vehicle;
- analyzing the sample of the at least one screened target; and
- transmitting results of the analyzed sample to the remote command station.

13. The method of claim 12, wherein the step of transmitting further comprises:
- storing each generated high-resolution image on the robotic vehicle;
- receiving a request from the remote command device at the robotic vehicle; and
- transmitting each stored high-resolution image from the robotic vehicle to the remote command device in response to the request.

14. The method of claim 13, wherein the robotic vehicle further comprises a panoramic imager for generating panoramic images and the method further comprises:
- acquiring a panoramic image of the landscape surrounding the current location of the robotic vehicle with the panoramic imager, the panoramic image comprising the plurality of geologic targets;
- transmitting the panoramic image from the robotic vehicle to the remote command device before the target data is received at the robotic vehicle.

15. A method for triaging a plurality of geologic targets on a remote planetary landscape with a robotic roving vehicle (RRV), wherein the plurality of geologic targets are disposed on a portion of the remote planetary landscape that surrounds the current location of the RRV and the RRV comprises a high-resolution imager for generating separate high resolution images of the plurality of geologic targets while the RRV remains at its current location, the method comprising:
- transmitting target data from a remote command device to the RRV, the target data identifying the plurality of geologic targets;
- receiving a separate high-resolution image of each one of the plurality of geologic targets at the remote command device, wherein the high-resolution image of the plurality of geologic targets comprise microscopic scale images of about 0.04 to about 0.2 mm/pixels from a distance ranging from about 1 to 10 meters, wherein each high-resolution image is generated by the high-resolution imager while the RRV remains at is current location; and
- transmitting screened target data from the remote command device to the RRV, the screened target data identifying at least one screened geologic target selected from the plurality of geologic targets, wherein after receiving the screened target data the RRV relocates to the position of the at least one screened geologic target and analyzes a sample of the at least one screened geologic target.

16. The method of claim 15, wherein the step of transmitting further comprises:
- presenting each received high-resolution image to a user for evaluation; and
- generating the screened target data based on input from the user.

17. The method of claim 15, wherein the RRV further comprising a panoramic imager for generating panoramic images of at least a portion of the remote planetary landscape surrounding the current location of the RRV and the method further comprises:
- receiving a panoramic image from the RRV at the remote command device;
- presenting the panoramic image to a user for analysis, the panoramic image comprising the plurality of geologic targets;
- generating target data identifying the plurality of geologic targets based on input from the user; and
- transmitting the target data from the remote command device to the RRV.

18. The robotic vehicle according to claim 1, wherein the robotic vehicle further comprises a robotic arm and the processor is further configured to control the robotic arm to obtain the sample of the at least one screened target.

19. The robotic vehicle according to claim 1, further comprising a camera mast, wherein the first imager is coupled to the camera mast and is not coupled to a robotic arm.

* * * * *